United States Patent Office 3,470,677
Patented Oct. 7, 1969

3,470,677
METHOD OF REACTIVATING MOLECULAR SIEVES
John C. Eck, Convent, and William C. Zegel, Mendham, N.J., assignors to Allied Chemical Corporation, New York, N.Y., a corporation of New York
No Drawing. Filed Jan. 24, 1967, Ser. No. 611,265
Int. Cl. B01d 41/02
U.S. Cl. 55—73                 5 Claims

ABSTRACT OF THE DISCLOSURE

The adsorptive capacity of molecular sieves used in sweetening sour gaseous hydrocarbons can be restored by treatment with hot water or low temperature steam.

---

This invention relates to an improvement in the process for the sweetening of sour gaseous hydrocarbon streams, such as propane, natural gas and the like by selectively removing therefrom undesirable odor and corrosion producing sulfur containing compounds such as hydrogen sulfide, mercaptans, thiophenes, etc., with molecular sieves. More particularly, the invention relates to a method of periodically restoring the adsorptive capacity of molecular sieves used in the above process.

It is known that certain natural and synthetic zeolites have the property of preferentially adsorbing certain types of sulfur containing impurities from mixtures of the same with hydrocarbons, as for example, removing hydrogen sulfide from propane. These zeolites are composed of crystal patterns such that they present structures having a large number of pores of exceptionally uniform size. Only molecules that are small enough to enter the pores can be separated by adsorption.

The pores in different known zeolites vary in diameter from about 3 angstroms up to 10 or more angstroms, but for any one zeolite the pores are of substantially uniform size. Because of these properties of uniform pore size and of selective adsorption for certain molecules in preference to others, such zeolites are known as molecular sieves.

Included among the naturally occurring zeolites that have molecular sieve properties are analcite, faujasite and chabazite. Zeolites differ from each other in chemical composition but they may be generally characterized as alkali metal or alkaline earth metal alumino-silicates. Analcite has the empirical formula $NaAlSi_2O_6$, faujasite that of $Na[(AlO_2)(SiO_2)].XH_2O$, while that of chabazite is $CaAl_2Si_3O_{12}.6H_2O$. Certain synthetic zeolites have been prepared which also have molecular sieve properties. For example, the Barrer patent, U.S. 2,306,610, teaches the use of a molecular sieve having the formula $(CaNa_2)Al_2Si_4O_{12}.2H_2O$, while Black in U.S. Patents 2,442,191 and 2,522,426 describes a synthetic molecular sieve having the formula $4CaO.Al_2O_3.4SiO_2$. A detailed discussion of molecular sieves can be found in articles by Breck and others, appearing in the Journal of the American Chemical Society, vol. 78, p. 5963 et seq. (December 1956).

It is known that sulfur containing organic compounds and hydrogen sulfide are selectively adsorbed from mixtures thereof with propane, natural gas, and the like by zeolitic molecular sieves having effective pore diameters of from about 4 to about 10 angstroms. Hydrogen sulfide is usually the main contaminant. In commercial operation, a cyclic process is employed involving an adsorption step followed by a desorption step to desorp the sulfur containing compounds and then a second adsorption step, and so on. This desorption is generally effected by continuing the flow of the hydrocarbon stream being treated and increasing the temperature or decreasing the pressure of the sieve bed or both. Although excellent separation of sulfur containing contaminants from the gaseous hydrocarbon stream can be obtained by this procedure, one of the limiting factors is that the adsorption capacity of the molecular sieves for the sulfur containing compounds decreases after a number of adsorption and desorption cycles until they are no longer sufficiently effective in reducing or removing the sulfur-containing compounds to the required low levels and must be discarded. The loss of sieve capacity is considered to involve two factors, one of these being the decrease in the saturation capacity of the sieve and the other being that the rate of adsorption decreases so that less material is adsorbed during a given period at a specified feed rate.

Methods heretofore employed for reactivating molecular sieves have included high temperature "burn off," i.e., heating the deactivated sieves to a temperature of 500–1,000° C. in the presence of oxygen to remove contaminants by a combination of vaporization, oxidation and decomposition as disclosed in U.S. Patent 3,030,431, or purging with high temperature steam or wet butane (U.S. Patents 2,974,179 and 3,075,023). It has been frequently observed, however, that with such regeneration treatments there is a continuous reduction in the sieve activity obtained due to the formation of irremovable deposits in the sieve pores. It is an object of the present invention to provide an improved process for periodically restoring the adsorption capacity of molecular sieves employed in the sweetening of gaseous hydrocarbon streams.

Another object of this invention is to provide a procedure for reactivating molecular sieves which avoids the formation of products which cannot be displaced from the pores of the sieves.

Additional objects and advantages of the invention will be apparent from the following detailed description thereof.

The term sour hydrocarbon connotes a hydrocarbon containing odoriferous sulfur compounds such as hydrogen sulfide, mercaptans and the like. Sweetening connotes the substantial removal of such sulfur compounds.

In accordance with the present invention it has been discovered that when the adsorption step is carried out employing a feed of sour gaseous hydrocarbons, the factors leading to a loss of molecular sieve adsorptive capacity are such that the most effective sieve reactivation process involves treatment with low temperature steam. An important factor in this loss of capacity is believed to be a change in the state of hydration of the sieve. It has been found that the capacity and/or activity of these sieves of substantially but only partially depleted adsorptive capacity can be restored by a treatment with $H_2O$, which not only removes contaminating products which are present, but adjusts the state of molecular sieve hydration to that at which the sieves exhibit maximum adsorptive capacity. The importance of adjusting the state of sieve hydration is indicated by the fact that treatment with $CH_2Cl_2$ removes essentially the same contaminants as $H_2O$ but does not significantly increase sieve activity.

In the procedure of the present invention, deactivated molecular sieves are treated with $H_2O$ until the molecular sieves have been hydrated to their highest state of hydration following which the sieves are partially dehydrated. The adsorptive capacity of used sieves for hydrogen sulfide and other sulfur containing impurities can be restored to substantially that of a new sieve according to these procedures. The $H_2O$ fed into contact with the molecular sieves can be in the form of either liquid or low temperature steam, with low temperature steam being preferred. No substantial amount of hydrocarbon can be added along with the $H_2O$ since the particular hydration of the sieve crystals required for reactivation cannot take place in the presence of any substantial quantity of hydrocarbon. Thus, if periodically during the desorption step, steam or hot water is added to a hydrocarbon desorbent, upon subsequently dehydrating the sieves it is found that the activity of sieves has not been increased significantly, contrary to the teachings of the prior art. When $H_2O$ alone is used as the treating agent, any hydrocarbons already present on the sieves are removed by the $H_2O$ at the beginning of the treatment following which the desired hydration is accomplished.

The temperature of the $H_2O$ employed in the treatment of the sieves has an important effect on the sieve reactivation. The $H_2O$ should be at a temperature of 60–300° C., and preferably at about 100–200° C. The dehydration can be conveniently accomplished by heating at a temperature of 200–400° C., preferably while passing a stream of inert gas such as nitrogen through the molecular sieves. High temperature steam treatment has an adverse effect on the sieve adsorptive capacity again contrary to the teachings of the prior art.

In measuring molecular sieve activity, the adsorption capacity of the sieves is determined by saturating the sieves with the sour gas stream. The weight of sulfur compounds adsorbed/100 g. of sieves can be computed either by measuring the weight gain of the sieves or, in a case where the volume percent composition of the gas stream is known, by measuring the volume of $H_2S$ required to saturate the sieves and converting the volume of $H_2S$ to weight of $H_2S$.

In a typical operation, the hydrocarbon stream is fed through the molecular sieves in the gaseous phase at approximately ambient temperature, generally in the range of 20–50° C. until the bed is saturated. Following this adsorption step, the selectively adsorbed hydrogen sulfide and organic sulfur compounds are displaced by raising the temperature of the sieve bed to between 300° C. and 500° C. while continuing the gaseous hydrocarbon flow. Desorption may be enhanced by concurrently reducing the gas pressure in the sieve bed. After the desorption step, more hydrocarbon feed is placed into contact with the molecular sieve and the adsorption and desorption steps are repeated. Adsorption-desorption cycles are run until the adsorptive capacity of the sieves has diminished considerably. The addition of hydrocarbon to the system is then stopped and $H_2O$ in either liquid or vapor phase is passed through the molecular sieve bed at a temperature of about 60–300° C. in a sufficient amount to hydrate the sieves to their highest state of hydration. The sieves are next dried by heating, preferably by means of a stream of inert gas such as nitrogen at 200–400° C. After drying, the sieves are in a reactivated state and the adsorption-desorption cycle can be resumed.

The following specific examples further illustrate our invention. All parts are parts by weight unless otherwise expressly noted.

EXAMPLE 1

The molecular sieves employed in this example were synthetic sodium alumino-silicate sieves having a pore diameter of about 9 angstroms. Tests were conducted with samples of unused and used sieves. The latter were from two different batches of sieves which had been employed in a cyclic process for the removal of undesirable sulfur-containing compounds, mainly hydrogen sulfide, from a gaseous hydrocarbon stream until the adsorption capacity for the sulfur-containing compounds had declined to about 50% of the original capacity.

Adsorption capacity was defined as the grams of hydrogen sulfide adsorbed at ambient temperature per 100 grams of sieve. Two procedures were used for determining this, one being based on the volume of hydrogen sulfide taken up by a sample of a sieve, the other being based on the weight gain by a sieve sample. Known quantities (ca. 20–25 grams) of nitrogen-saturated sieves were used to measure the amount adsorbed. These samples were prepared by placing a portion of a sieve in a one-inch diameter glass tube of known weight in the form of a compact bed about six inches long; placing the charged tube in a muffle furnace and heating it at a temperature of 350° C. for a period of three hours while passing a stream of preheated nitrogen (ca. 350° C.) through the bed at a rate of about 2 ml./min.; then allowing the tube and sample to cool to room temperature while maintaining a flow of unheated nitrogen through the bed.

When the hydrogen sulfide adsorption was measured by the volume of hydrogen sulfide adsorbed, the tube and sample were weighed to find the amount of nitrogen-saturated sieve sample being tested; the tube containing this sample was then placed in a gas train and a stream of natural gas containing one volume percent hydrogen sulfide passed through the bed at a rate of about 5 ml./min. of hydrogen sulfide until the exit stream showed that no more hydrogen sulfide was being adsorbed as determined by passing the exit gas stream through a one percent solution of lead acetate acidified with hydrochloric acid to a pH of 3. The presence of hydrogen sulfide in the exit stream was shown by formation of black lead sulfide precipitate. The amount of hydrogen sulfide passed into the bed up to this point was determined by metering.

Nitrogen-saturated sieve samples were also used to determine hydrogen sulfide adsorption by the gain in weight of samples prepared as outlined above. A stream of natural gas containing one volume percent hydrogen sulfide was passed through the samples for a period of time known by preliminary tests to be sufficient to saturate the samples with sulfide and the tubes with sulfide saturated samples weighed, thus giving the increase in weight due to sulfide adsorption. It was also possible to follow the adsorption of the sulfide through the sample beds by following the forward movement of the heat of adsorption as the sulfide was taken up.

The effectiveness of steam reactivation of used sieves was shown in tests with samples from two different batches of used sieves. In one case these were obtained from a cyclic plant process wherein a gas consisting mainly of propane at a presure of 300 p.s.i.g. was passed through the sieves at ambient temperature with a regenerative cycle, i.e., desorption of the sulfur-containing compounds, carried out by treating with the propane stream at a pressure of about 60 p.s.i.g. at a temperature of 215° C. A sample of these sieves was preheated in nitrogen to a temperature of about 120° C. and then steam at a temperature of about 120° C. passed continuously through the sample for two hours in the amount of 100 grams of steam for each gram of sample. After steaming, the sample was heated in a stream of nitrogen for three hours at 350° C. and the amount of hydrogen sulfide adsorbed at room temperature determined as previously outlined: 7.3 grams of hydrogen sulfide was adsorbed per 100 grams of sieves. Adsorption values for new sieves and untreated sieves (nonsteamed) were 7.8 and 3.9 grams of hydrogen sulfide per 100 grams of sieve respectively. These sieves were subjected only to the 350° C. nitrogen treatment.

Sieves from another cyclic plant process were also reactivated. In this plant process an $H_2S$ containing propane gas stream at a pressure of 300 p.s.i.g. was passed through the sieves at ambient temperature with a desorption cycle carried out with the propane gas stream at a pressure of about 250 p.s.i.g. and at a temperature of 215° C. A sample of these sieves was also subjected to the 120° C.-2 hour-steam and 350° C.-3 hour nitrogen treatment. Adsorption capacity was then 6.5 grams of hydrogen sulfide per 100 grams of sieve. Values for a new sieve and an untreated sieve were 7.9 and 4.9 grams of hydrogen sulfide per 100 grams of sieve respectively.

EXAMPLE 2

A sample of the sieve used in the first regeneration test in Example 1 was preheated to 96° C. and a stream of water at 96° C. was passed continuously through the sample for a period of two hours in the amount of 100 grams of water per gram of sieve. This water-treated sample was then subjected to the 350° C.-3-hour nitrogen treatment and the hydrogen sulfide adsorption measured as previously described. Hydrogen sulfide capacity was 5.9 grams per 100 grams of sieve. Values for new sieves and untreated sieves were 7.9 and 3.9 grams of hydrogen sulfide per 100 grams of sieve.

EXAMPLE 3

The molecular sieves employed in this example were synthetic calcium alumino-silicate sieves having pore diameters of about 5 angstroms. Tests were conducted with samples of used sieves which were from a batch of sieves that had been employed in a cyclic plant process for the removal of sulfur-containing compounds, mainly hydrogen sulfide, from natural gas until the adsorption capacity had declined to about 60% of the original capacity. Natural gas had been passed through these sieves at a pressure of 200 p.s.i.g. at ambient temperature and desorption of the sulfur compounds had been carried out with natural gas at ambient temperature and atmospheric pressure.

A sample of the above sieves was treated with steam and heated nitrogen as described in Example 1 and another sample with the heated nitrogen only as control. Adsorptions were 7.5 and 5.9 grams of hydrogen sulfide per 100 grams of sieve, respectively.

EXAMPLE 4

A comparison of the effectiveness of the regenerating process of our invention with known prior art regenerative techniques was made. A propane gas steam containing 1 volume percent $H_2S$ was sweetened by passage over a 9 A. molecular sieve using the adsorption-desorption process of Example 1. When the $H_2S$ capacity of the sieve had decreased to 50% of that of the new sieve, portions of the sieve bed were subjected to five different regenerative treatments as tabulated below:

| Run | Regeneration technique | $H_2S$ Capacity (g. $H_2S$/100 g. sieve) | Percent Initial $H_2S$ capacity after treatment |
|---|---|---|---|
| A | New sieve (none) | 7.88 | 100.0 |
| B | Used (none) | 3.94 | 50.0 |
| C | High temperature steam (500° C.) | 3.11 | 39.6 |
| D | Wet butane | 4.12 | 52.3 |
| E | Heat+$O_2$ (1,000° C.) | 7.51 | 95.5 |
| F | Low temperature steam (150° C.) | 7.30 | 92.3 |
| G | Hot water (90° C.) | 5.91 | 75.1 |

As shown above, treatment with wet butane (Run D) is completely ineffective. The attempt at regeneration with high temperature steam (Run C) actually reduced the capacity of the used sieve still further. High temperature burning (Run E) and low temperature steam treatment (Run F) both returned the sieve to essentially its initial capacity. Hot water treatment (Run G), although not as effective as low temperature steaming (Run F) is clearly beneficial.

We claim:

1. In a process for sweetening gaseous hydrocarbon streams by contacting said hydrocarbon stream at approximately ambient temperature with a zeolitic molecular sieve adsorbent to selectively adsorb the sulfur containing compounds therein and subsequently desorbing said sulfur containing compounds from said zeolitic molecular sieve adsorbent, the adsorption and desorption of said sulfur containing compounds being cyclically repeated until the adsorptive capacity of said molecular sieve adsorbent is substantially but not completely depleted, the improvement which comprises periodically restoring the adsorptive capacity of said molecular sieve adsorbent whose capacity is partially depleted by passing a reactivating stream consisting essentially of $H_2O$ at a temperature of from about 60° C. to about 300° C. through said molecular sieve adsorbent and subsequently drying said molecular sieve adsorbent.

2. A process in accordance with claim 1 wherein said zeolitic molecular sieve adsorbent has pores of a diameter of from 4 to 10 angstroms.

3. A process in accordance with claim 1 wherein said $H_2O$ is passed through the molecular sieve in the form of steam at a temperature of from 100° C. to 200° C.

4. A process in accordance with claim 1 wherein said desorption is effected by raising the temperature of said zeolitic molecular sieve adsorbent to at least 100° C. in the presence of the gaseous hydrocarbon stream being treated.

5. A process in accordance with claim 1 wherein said drying is effected with a stream of nitrogen at 200°–400° C.

References Cited
UNITED STATES PATENTS 2,882,244  4/1959  Milton _____ 55—75 X
3,405,057  10/1968  Neuzil et al. _____ 55—75 X JAMES L. DECESARE, Primary Examiner U.S. Cl. X.R.
55—75